United States Patent
Arool Emmanuel et al.

(10) Patent No.: US 11,652,672 B1
(45) Date of Patent: May 16, 2023

(54) ADAPTIVE GUARD INTERVAL USING CHANNEL IMPULSE RESPONSE DATA

(71) Applicant: Amazon Technologies, Inc., Seattle, WA (US)

(72) Inventors: Cyril Arokiaraj Arool Emmanuel, San Jose, CA (US); Satyabh Mishra, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 20 days.

(21) Appl. No.: 17/206,995

(22) Filed: Mar. 19, 2021

(51) Int. Cl.
 *H04L 25/02* (2006.01)
 *H04L 27/26* (2006.01)

(52) U.S. Cl.
 CPC .......... *H04L 25/025* (2013.01); *H04L 25/022* (2013.01); *H04L 25/0212* (2013.01); *H04L 27/2607* (2013.01)

(58) Field of Classification Search
 CPC . H04L 25/025; H04L 25/0212; H04L 25/022; H04L 27/2607
 See application file for complete search history.

(56) References Cited

U.S. PATENT DOCUMENTS

| | | | |
|---|---|---|---|
| 2009/0080555 A1* | 3/2009 | Li | H04L 27/2607 375/260 |
| 2012/0057489 A1* | 3/2012 | Shiotsuki | H04W 40/12 370/252 |
| 2012/0183107 A1* | 7/2012 | Zhu | H04L 25/0216 375/348 |

* cited by examiner

Primary Examiner — Natasha W Cosme
(74) Attorney, Agent, or Firm — Lowenstein Sandler LLP

(57) ABSTRACT

A method and system to determine an adjusted guard interval duration associated with a wireless signal transmitted via a wireless communication link between a first network device and a second network device in a wireless network. The second network device receives a first wireless signal including a first duration of a guard interval from the first network device at a first time. The second network device determines, in view of the set of pilot symbols, a channel impulse response. A channel parameter value is determined based on the channel impulse response. An adjusted guard interval duration corresponding to the channel parameter value is established and used to estimate a second physical rate of the link. The second network device provides a communication identifying the adjusted guard interval duration to the first network device in response to determining the second physical rate is greater than the first physical rate.

20 Claims, 7 Drawing Sheets

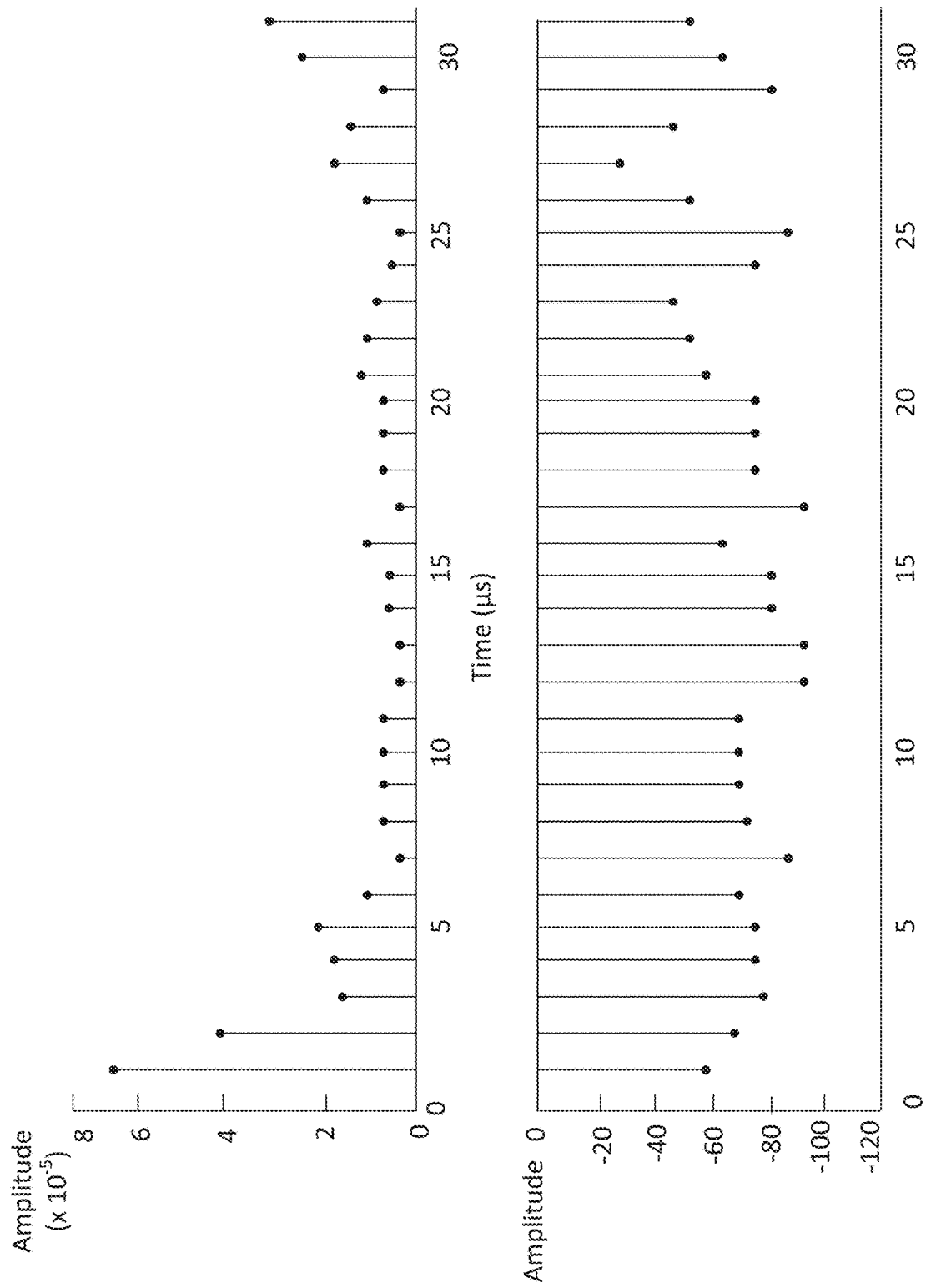

ADAPTIVE GUARD INTERVAL USING CHANNEL IMPULSE RESPONSE DATA

BACKGROUND

A wireless network can include multiple concurrent connection paths or links between multiple electronic devices (referred to herein as client devices, stations, endpoint devices, user devices, or user equipment) and one or more network devices (e.g., one or more access point devices)). These electronic devices wirelessly communicate with a communications infrastructure to enable the consumption of the digital media items corresponding to different consumer applications (e.g., artificial reality, virtual reality, gaming, streaming media, etc.). In order to wirelessly communicate with other devices, these electronic devices include one or more antennas.

A wireless network may support establishing point-to-point wireless links between the participating communication devices. A network device may utilize the wireless network for accessing digital content stored on one or more digital content servers within or outside of the wireless network.

BRIEF DESCRIPTION OF DRAWINGS

The present disclosure will be understood more fully from the detailed description given below and from the accompanying drawings of various embodiments, which, however, should not be taken to limit the present disclosure to the specific embodiments, but are for explanation and understanding only.

FIG. 4 illustrates an example channel impulse response of complex channel coefficients determined based on pilot symbols associated with a communication between a first network device and a second network device, according to one or more embodiments.

DETAILED DESCRIPTION

Figure 1:
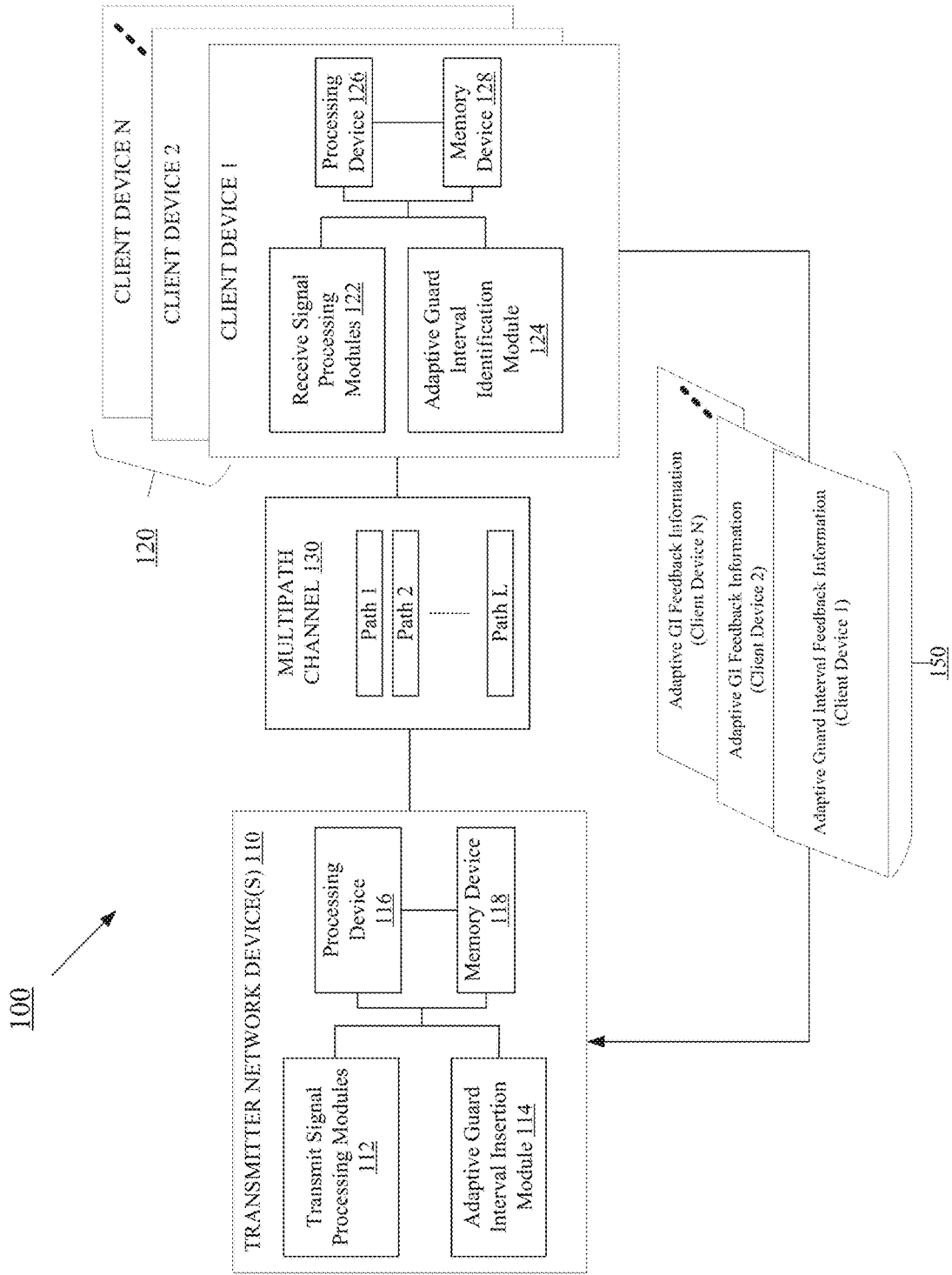
FIG. 1 illustrates an example wireless network including one or more transmitter network devices and one or more client devices using an adaptive guard interval duration, according to one or more embodiments.

Technologies directed to reducing interference and improving throughput levels in a wireless network are described. To manage the multiple connection paths, wireless networks may employ a multiplexing system such as orthogonal frequency-division multiplexing (OFDM) with multiple-input, multiple-output (MIMO) techniques (e.g., Wi-Fi spatial streaming) to provide high throughputs to support low latency consumer applications. Typical MIMO techniques utilize multi-path characteristics of the wireless channel for spatial multiplexing a transmitted signal including a sequence of data symbols (e.g., a distinct waveform or state of the communication channel that persists for a fixed period of time) transmitted sequentially over time to sustain high throughputs. However, the linear time-varying property of a wireless channel in a typical user environment (e.g., within a user's home environment), introduces small scale fading (i.e., rapid changes of the amplitude and phase of a radio signal over a short period of time or a short distance) leading to multi-path delay spread (i.e., time dispersion) and Doppler spread (i.e., frequency dispersion) causing inter-symbol interference (ISI) and inter-carrier interference (ICI) resulting in poor throughputs.

To address interference issues, guard intervals (i.e., a time period inserted at the beginning of each symbol) are used in connection with the transmission of each symbol to ensure that distinct transmissions do not interfere with one another, or otherwise cause overlapping transmissions. The purpose of the guard interval is to introduce immunity to propagation delays, echoes, and reflections, to which digital data is very sensitive.

However, the aforementioned existing techniques employ guard intervals that have a pre-defined and static length and cause significant processing overheads in the end-to-end connection path (e.g., a communication link between an access point (AP) and a client device or station (STA), that cause a reduction in throughput and degradation in the overall network performance and efficiency.

Aspects of the present disclosure address the above and other deficiencies of inter-symbol interference by adapting or adjusting a length or duration of a guard interval or cyclic prefix (CP) (herein referred to as a "guard interval" (GI)) on a per-client-device basis to enhance throughput levels corresponding to the respective client devices. Aspects of the present disclosure can determine a channel impulse response (CIR) corresponding to a communication or radio frequency (RF) link between a transmitter network device (e.g. an access point device) and a particular client device of a set of concurrently connected client devices in the wireless network (e.g., an OFDM-based wireless network having multiple signal paths configured in accordance with IEEE 802.11n/ac/ax standards including corresponding sets of medium access control (MAC) and physical layer (PHY) protocols for implementing wireless local area (WLAN) computer communications).

In at least one embodiment, logic of each respective receiver network device (e.g., a client device) can determine a physical (PHY) rate or data rate associated with a first wireless signal transmitted using a first duration of a guard interval.

In an embodiment, logic of each respective client device can determine one or more channel characteristic parameters (also referred to as a "channel parameter" based on the channel impulse response corresponding to a portion of a signal transmitted between the client device and a network device (e.g., an access point device) at a first time. The one or more channel parameters can include a root-mean-square (RMS) delay spread, a mean excess delay time, a maximum excess delay time, and a time of flight (ToF) extracted from the channel impulse response.

In an embodiment, the client device can estimate an adjusted duration of the guard interval based on the determined channel parameter. In an embodiment, the client device estimates or establishes the adjusted guard interval duration to equal the value of the determined channel parameter. For example, the adjusted guard interval duration can be set to the RMS delay spread value. In an embodiment, an estimated physical rate is determined based on the adjusted duration (e.g., a second duration) of the guard interval. In an embodiment, the estimated physical rate based on the adjusted duration of the guard interval that is equal to the RMS delay spread value is determined for the particular link between the client device and the transmitter network device.

In an embodiment, the first physical rate determined using the first duration of the guard interval is compared to the second physical rate determined using the second or adjusted duration of the guard interval to determine if a condition is satisfied. In an embodiment, the condition is satisfied when the second physical rate is greater than the first physical rate. In an embodiment, satisfaction of the condition indicates that a higher physical rate (e.g., an optimized throughput level) can be achieved by using the adjusted duration of the guard interval. Advantageously, identification of the adjusted duration of the guard interval that produces a higher physical rate as compared to the physical rate associated with the first duration of the guard interval can be performed on a per-client-device basis in real-time. This enables each particular client device to receive a portion of a throughput budget of the network that corresponds to the particular client device requirements based on a current use case (e.g., environmental factors associated with a location of the client device, the communication link between the client device and the transmitting network device), the one or more applications being executed by the client device, the physical rate, etc.). Advantageously, the guard interval duration can be adapted or adjusted to correspond to an optimized throughput rate for the particular use case scenario corresponding to the client device as determined using a suitable IEEE 801.11-based rate adaptation scheme. Furthermore, an adaptation of the guard interval for each connection link (e.g., each client device to a transmitter network device connection link) based on corresponding channel characteristic information increases the throughput and physical rates for the respective client device and improves the overall performance and efficiency of the wireless network, thereby benefiting all of the client devices concurrently connected within the wireless network.

In an embodiment, in response to satisfying the condition, the logic of the client device sends feedback information identifying the adjusted guard interval duration to the access point network device. The logic of the access point network device, at a second time, inserts the guard interval having the adjusted guard interval duration into a portion of the signal transmitted to the client device. Advantageously, the adaptive guard interval processing can be iteratively executed during runtime to identify adjusted guard interval durations to continually optimize the throughput associated with a transmission between the transmitter network device and each client device connected within the wireless network.

FIG. 1 illustrates an example wireless network 100 including one or more transmit network devices 110 (e.g., an access point device or router device or gateway device coupled to an upstream network or system) and multiple client devices 120 (e.g., client device 1, client device 2 . . . client device N). In an embodiment, each client device 120 is communicatively coupled to a transmitter network device 110 (also referred to herein as an access point network device 110) via a respective communication link (or wireless link) of a multipath channel 130 including multiple communication paths (e.g., path 1, path 2 . . . path L). A channel (e.g. a WiFi channel) is a medium through which the wireless network sends and receives data. In an embodiment, the wireless network can have multiple different channels or sets of bands within a wireless frequency band (e.g., a 2.4 GHz frequency band, a 5 GHz band, etc.) In an embodiment, each channel can be allocated to a corresponding frequency range which prescribes a center frequency and channel bandwidth). In an embodiment, a wireless signal can be propagated over multiple paths of the channel, where each path has a corresponding time delay. In an embodiment, a wireless link is established between each transmit network device and each client device to enable wireless signals to propagate between the devices via the multiple paths within the wireless channel.

According to embodiments, the client device 110 can be a mobile device, a personal digital assistant (PDA), a portable media player, a tablet computer, a desktop computer, a laptop computer, a netbook, an electronic reader device, a media streaming device, a voice-controlled device, and the like configured to connect to the wireless network 100.

In an embodiment, the transmitter network device 110 includes one or more transmit signal processing modules 112 to generate a wireless signal to transmit via the multipath channel 130 to a receiving client device 120. For example, the transmit signal processing modules 112 can signal processing components configured to generate and transmit multiple wireless signals including a first wireless signal transmitted to a first client device (e.g., client device 1) of the set of client devices 120 via a first link. In this example, the transmit signal processing modules 112 can signal processing components configured to generate and transmit multiple wireless signals including a second wireless signal to a second client device (e.g., client device 2) of the set of client devices 120 via a second link. In this example, the transmit signal processing modules 112 can signal processing components configured to generate and transmit multiple wireless signals including and an Nth wireless signal to an Nth client device (e.g., client device N) of the set of client devices 120 via an Nth link.

In an embodiment, the transmit signal processing modules 112 can include an OFDM system, a modulator, a power amplifier, and an antenna configured to implement an OFDM scheme using adaptive guard interval data received from the adaptive guard interval insertion module 114. In an embodiment, the OFDM system (or sub-system) includes digital signal processing logic (e.g., hardware, software, or any combination thereof) that implements a digital multi-carrier modulation scheme-OFDM scheme. The OFDM scheme extends the concept of a single subcarrier modulation by using multiple subcarriers within a same single channel. Rather than transmitting a high-rate stream of data with a single subcarrier, OFDM uses a number of closely spaced orthogonal subcarriers that are transmitted in parallel. Each subcarrier is modulated with a digital modulation scheme, such as QPSK, 16QAM, etc.) at a low symbol rate. The combination of many subcarriers enables similar data rates as single-carrier modulation schemes with similar bandwidths. In the OFDM system, different streams of information are mapped onto separate parallel frequency channels, each channel being separated from the others by a frequency guard band to reduce interference between adjacent channels. So, in the OFDM system, multiple subcarriers carry the information stream and the subcarriers are orthogonal to each other and the adaptive guard interval is added to each symbol (e.g., inserted at a beginning of each data symbol) to minimize the channel delay spread and inter-symbol interference.

In the digital domain, the OFDM system can map digital modulated input data, referred to as data symbols, onto orthogonal subcarriers. The data symbols are frequency-domain input data, such as complex numbers represented the modulated subcarriers, and the OFDM system converts the data symbols to the time-domain output data that represent the analog OFDM symbol waveforms. In an embodiment, the transmit signal processing modules 112 can include a modulator configured to receive the output data from the OFDM system, modulates the output data to add the output data to a carrier signal to obtain a data-carrying signal. The data-carrying signal is output by the modulator to a power amplifier that amplifies the data-carrying signal to broadcast the data-carrying signal as an RF or wireless signal via an antenna.

In an embodiment, the transmit signal processing modules 112 can include one or more components associated with an OFDM-based transmitter network device 110, such as a forward error correction encoder component, a signal interleaving and mapping component, a transfer function component (e.g., an inverse fast Fourier transform (IFFT) component), a waveform shaping component, an in-phase and quadrature input (IQ) modulator (e.g., a component to convert baseband information into wireless (RF) signals) to perform the OFDM scheme, as described above.

According to embodiments, the transmit signal processing modules 112 can include suitable signal processing components configured to perform operations associated with an OFDM-based scheme. In an embodiment, the transmit signal processing modules 112 employ a modulation scheme (e.g., an OFDM scheme) in which the transmitted data is divided into several parallel channels, which are carried by a large number of closely-spaced orthogonal subcarriers. In an embodiment, the transmit signal processing modules 112 are configured to perform forward error correction operations and interleaving and mapping operations to map modulated symbols to the individual subcarriers of the wireless signal. In an embodiment, the transmit signal processing modules 112 divides the multipath channel 130 into a set of subcarriers through a mathematical function (i.e., an inverse fast Fourier transform (IFFT)). In an embodiment, the transmit signal processing modules 112 include an IFFT module configured to receive the modulated symbols that are mapped to individual subcarriers and generate corresponding time-domain samples. In an embodiment, the spacing between the subcarriers is orthogonal to reduce interference between the subcarriers. In an embodiment, the subcarriers can include a first set of subcarriers including modulated data (e.g., data symbols) and a second set of subcarriers including pilot symbols used for synchronization between the transmitter network device 110 and the client device 120. In an embodiment, to obtain channel state information, pilot symbols (known to both the transmitter network device 110 and the client device 120) having pre-defined modulation schemes are modulated on to specific sub-carriers for channel estimation. In an embodiment, the pilot symbols are separated from the data symbols and used by the client device to detect a start of a data symbol and obtain channel state information.

In an embodiment, the transmit signal processing modules 112 places symbols on the channel at a fixed and known symbol rate, and the client device 120 detects the sequence of symbols in order to reconstruct the transmitted data. In an example, each symbol may encode one or several binary digits or 'bits'. The data may also be represented by the transitions between symbols, or even by a sequence of many symbols.

In an embodiment, the adaptive guard interval insertion module 114 includes logic configured to generate and insert an adaptive guard interval corresponding to the symbols of the signal. The adaptive guard intervals are used to ensure that distinct transmissions do not interfere with one another, or otherwise cause overlapping transmissions. In an embodiment, the adaptive guard intervals are used to address propagation delays, echoes and reflections associated with an environment of the wireless network 100. In an embodiment, the beginning of each symbol is preceded by an adaptive guard interval that is inserted by the adaptive guard interval insertion module 114. In an embodiment, if a signal echo falls within the adaptive guard interval, the echo does not affect the ability of the respective client device 120 (e.g., the receiving device) to safely decode the actual data, as data is only interpreted outside the adaptive guard interval. In an embodiment, at a first time associated with transmitting a wireless signal to a first client device via a first link, the adaptive guard interval insertion module 114 inserts a first guard interval having a first duration (e.g., a default duration value).

In an embodiment, the one or more transmitter network devices 110 includes a processing device 116 and a memory 118. The processing device 116 can include one or more suitable processing devices configured to execute instructions stored in the memory 118 to perform operations and functions associated with the transmission of wireless signals having an adaptive guard interval duration to the one or more client devices 120. The memory 118 may be any suitable memory or data storage location, including a non-transitory computer-readable storage medium, such as, but not limited to, any type of database, disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

In an embodiment, the wireless signal including the first set of symbols (e.g., data symbols) and the second set of symbols (e.g., the pilot symbols) are transmitted by the transmitter network device 110 to the client device 120 via the multipath wireless channel 130. During transmission, the symbols of the wireless signal are subjected to small-scale fading, due to constructive and destructive interference of the multiple signal paths between the transmitter network device 110 and the client device 120. The small-scale propagation effects in the one or more multipath channels 130 can be due to the presence of multiple random reflectors and scatterers during signal propagation (e.g., spurious objects or components located in the physical path of the signal in an environment of the wireless network, such as objects within a home environment). For example, the small-scale multipath fading impacts the throughput of indoor wireless communication systems. Based on a time delay spread (e.g., a time difference between the arrival of the first measured path and the last measured path of the multipath channel 130, small scale fading can be either flat fading or frequency selective fading leading to time dispersion causing inter-symbol interference (ISI), leading to poor throughputs associated with transmission to the client devices 120. For example, if the duration of the transmitted symbol exceeds the delay spread, then the symbols experience inter-symbol interference.

In an embodiment, each of the one or more client devices 120 includes one or more receive signal processing modules 122, an adaptive guard interval identification module 124, one or more processing devices 126, and one or more memory devices 128. In an embodiment, the receive signal processing modules 122 are configured to receive the wireless signal transmitted via the multipath channel 130 from the transmitter network device 110. For example, the receive signal processing modules 122 of a first client device (e.g., client device 1) can signal processing components configured to receive the first wireless signal transmitted to a first client device (e.g., client device 1) of the set of client devices 120 via the first link.

According to embodiments, the receive signal processing modules 122 can include suitable signal processing components configured to perform operations associated with an OFDM-based scheme. In an embodiment, the receive signal processing modules 122 into a fast Fourier transform (FFT) module to apply an FFT to the symbols of the wireless signal for demodulation.

In an embodiment, the receive signal processing modules 122 can include one or more components associated with a client device 120 configured to receive and process wireless signals in accordance with the OFDM scheme. In an embodiment, the receive signal processing modules 122 can include OFDM-based system components such as an automatic gain control component, an automatic frequency control clock recovery component, a transfer function component (e.g., a fast Fourier transform (FFT) component), a signal deinterleaving and demapping component, and a forward error correction decoder component.

In an embodiment, the receive signal processing modules 122 are configured to determine a channel impulse response (CIR) associated with the corresponding wireless link. In an embodiment, the efficiency of the channel estimation has a direct impact on the bit error rate (BER) performance. Channel state information is derived from the channel impulse responses of the known pilot symbols (i.e., pilot signals) by the receive signal processing modules 122 of the client device 120. In an embodiment, the pilot signals are arranged in a comb-type manner and provides information about the transmitted symbols (bits), channel impairments due to small-scale fading effects (e.g., multipath delay spreads, Doppler spreads, etc.), and flat/frequency selective fading effects.

In an embodiment, the channel impulse response is used to characterize the propagation path between the transmitter network device 110 and the client device 120 wherein a continuous periodic test sequence represented by the pilot symbols arrives at the client device 120 and is correlated with the original sequence. In an embodiment, the receive signal processing modules 122 obtains the transfer function (e.g., a FFT generated by a FFT module) of the channel impulse response to make an estimation of the channel environment.

In an embodiment, system bit error rate (BER) reliability is increased using the comb-type arrangement in fast-fading channel environments, such as in an in-home wireless network environment. In an embodiment, the receive signal processing modules 122 are configured to perform frequency-domain channel estimation using an equalizer or decoder executing a suitable algorithm (e.g., a least-squares (LS) algorithm, a minimum mean square error (MMSE) algorithm, a maximum likelihood algorithm, etc.) to estimate the channel impulse responses from complex channel coefficients representing the channel impulse responses of the pilot signals. For example, in an M×N multiple-input multiple-output (MIMO) system having a 20 MHz channel bandwidth, where M is a number of antennas of transmitter network devices 110 (i.e., a number of inputs) and N is a number of antennas of client devices 120 (i.e., a number of outputs), the channel impulse response is a complex matrix of M×N×56 coefficients. In an embodiment, due to multipath reflections corresponding to the multipath channel 130, the channel impulse response of the wireless channel can be represented as a series of pulses corresponding to the set of complex channel coefficients, as described and shown in greater detail below with respect to FIG. 4.

In an embodiment, the adaptive guard interval identification module 124 of each client device 120 is configured to determine one or more channel parameters (e.g., a delay spread, an RMS delay spread, a mean excess delay, a maximum excess delay time, a time of flight) based on or extracted from the pilot signal channel impulse response. In an embodiment, the adaptive guard interval identification module 124 calculates the one or more client device-specific channel parameters based on the channel impulse response. Example signal processing and calculation of example channel parameters based on the channel impulse response are described in greater detail below with respect to FIGS. 2, 5, and 6.

In an embodiment, the adaptive guard interval identification module 124 uses the one or more channel parameters associated with the particular client device 120 to adjust or adapt a duration or length of the guard interval on a per-client-device basis. In an embodiment, the adaptive guard interval identification module 124 estimates an adjusted guard interval duration based on the one or more channel parameters and a physical layer (PHY) rate associated with the wireless link between the client device 120 and the transmitter network device 110. The physical rate represents a link-specific maximum speed that data can move across a particular wireless link between the transmitter network device 110 and the client device 120. In an embodiment, the adaptive guard interval identification module 124 calculates the physical rate based on a signal strength associated with the wireless link and uses a table that maps signal levels to corresponding physical data rates. In an embodiment, the adaptive guard interval identification module 124 determines the physical rate representing the speed at which the client device 120 communicates with the transmitter network device 110. In an embodiment, the adaptive guard interval identification module 124 can determine changes to the physical rate in response to changes in location or position of the client device 120 relative to the transmitter network device 110.

In an embodiment, the adaptive guard interval identification module 124 determines whether the adjusted guard interval duration (e.g., the estimated guard interval duration) corresponds to an optimized throughput level associated with the wireless link between the transmitter network device 110 and the client device 120. In an embodiment, the adaptive guard interval identification module 124 analyzes the adjusted guard interval duration to determine if the throughput level is optimal for the particular use case scenario (e.g., the particular environmental factors associated with the particular wireless link corresponding to the particular client device 120 and transmitter network device 110).

In an embodiment, the client device 120 (e.g., one or more of the receive signal processing modules 122) performs a rate adaptation algorithm or scheme to compare a measured or determined physical rate associated with the link based on a first duration of the guard interval with an estimated or second physical rate associated with the link based on a second or adjusted duration of the guard interval duration. In an embodiment, the rate adaptation process or scheme is executed to determine if the physical rate associated with the second or adjusted duration of the guard interval duration is greater than the physical rate associated with the first duration of the guard interval for the particular client device under the current wireless channel conditions (e.g., the particular use case). In an embodiment, the rate adaptation process consists of assessing channel conditions and accordingly adjusting the throughput. In an embodiment, a suitable IEEE 802.11 network-based rate adaptation process can be employed to determine the optimized throughput rate based on the adjusted guard interval duration.

In an embodiment, upon determining the throughput level is optimal (e.g., the physical rate using the adjusted duration of the guard interval is greater than the physical rate using the first duration of the guard interval) for the particular use case scenario, the adaptive guard interval identification module 124 generates and sends a feedback communication 150 to the transmitter network device 110 including information identifying the adjusted guard interval duration. As shown in FIG. 1, respective adaptive guard interval identification modules 124 of the respective client devices (e.g., client device 1, client device 2 . . . client device N) are configured to generate and send communications including the respective adaptive guard interval feedback information 150 corresponding to the respective client devices and their respective use case scenarios.

In an embodiment, upon receipt of a communication including adaptive guard interval feedback information 150, the adaptive guard interval insertion module 114 of the transmitter network device 110 adjusts the duration of the guard interval to correspond to the adjusted guard interval duration corresponding to the particular client device. In an embodiment, the adaptive guard interval insertion module 114 applies the adjusted guard interval duration to the data symbols to be transmitted to the client device 120. Advantageously, the adjustment of the guard interval duration for each respective client device 120 improves the throughput rate and physical rate associated with each client device 120, which thereby increases the overall throughput level of the wireless network 100.

Figure 2:
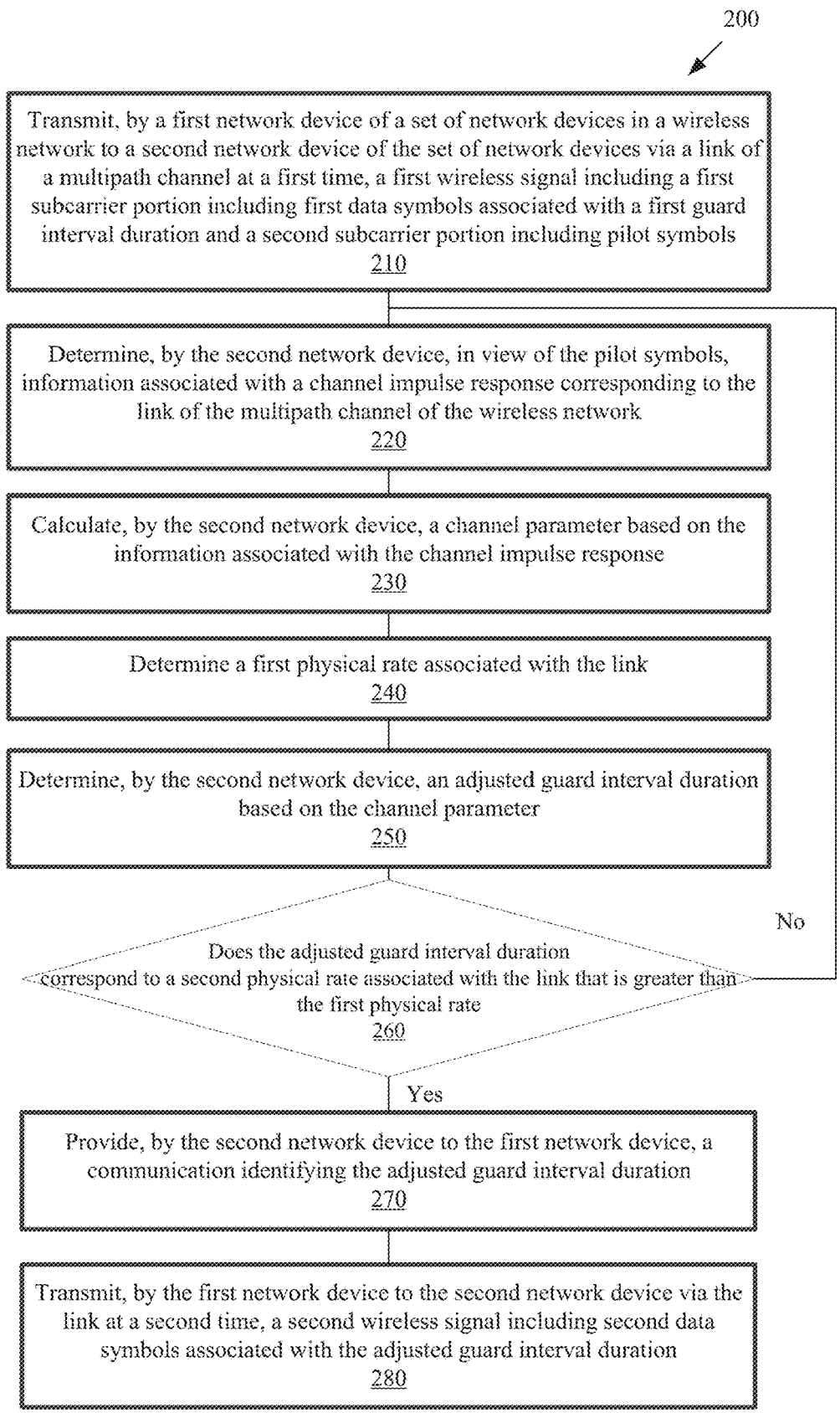
FIG. 2 is an exemplary flow diagram of a method for establishing an adjusted guard interval duration corresponding to a particular client device and associated use-case scenario, according to one or more embodiments.

FIG. 2 is an exemplary flow diagram of one embodiment of a method 200 for establishing an adaptive guard interval duration for insertion in a wireless signal transmitted between a first network device (e.g., an access point network device) and a second network device (e.g., a client device) in a wireless network, according to embodiments of the present disclosure. It is understood that the flowchart of FIG. 2 provides an example of the many different types of functional arrangements that may be employed to implement the operation of a cost metric manager of an access point device or a destination device as described herein. The method 200 of FIG. 2 may be performed by processing logic of an adaptive guard interval insertion module of a first device (e.g., adaptive guard interval insertion module 114 of a transmitter network device 110 of FIG. 1) and an adaptive guard interval identification module (e.g., adaptive guard interval identification module 124 of a client device 120 of FIG. 1) that comprises hardware (e.g., circuitry, dedicated logic, programmable logic, microcode, etc.), software (e.g., instructions run on a processing device to perform hardware simulation), or a combination thereof. Although the processing logic performing the operation of method 200 may be part of each of the one or more transmitter network devices (e.g., access point devices) and part of each of the one or more client devices, for illustrative purposes, the operations described below are described from the perspective of a first network device (e.g., a first transmitter network device such as an access point network device or router device) and a second network device (e.g., a client device of the set of client devices connected within the wireless network). The operations of method 200 may be performed in any order so as to fit the needs of the functionality to be provided.

In block 210, the processing logic of a first network device (e.g., a transmitter network device such as an access point network device or router device) of a set of network devices in a wireless network, transmits a first wireless signal to a second network device via a link of a multipath channel at a first time. In an embodiment, the first wireless signal includes a first subcarrier portion including a set of first data symbols associated with a first guard interval duration and a second subcarrier portion including a set of pilot symbols. In an embodiment, the first guard interval duration inserted into the first wireless signal at the first time can be a default or predetermined value (e.g., 0.4 μs, 0.8 μs, etc.).

In an embodiment, a channel may be divided into subcarriers (e.g., through a transform function) wherein the spacing between the subcarriers is orthogonal to prevent or reduce interface. For example, a 20 MHz channel can include 64 subcarriers having a first set of subcarriers (e.g., 52 subcarriers) are data subcarriers including data symbols, a second set of subcarriers (e.g., 4 subcarriers) are pilot subcarriers including pilot symbols, and a third set of unused subcarriers (e.g., 8 unused subcarriers). In an embodiment, the set of pilot symbols of the second subcarrier portion of the first wireless signal are symbols (e.g., OFDM symbols) having predefined values that are known by the first network device and the second network device.

In an embodiment, in the frequency domain, multiple adjacent tones or subcarriers are each independently modulated with complex data. An Inverse FFT transform is performed on the frequency-domain subcarriers to produce a symbol in the time-domain. In an embodiment, in the time domain, the adaptive guard intervals are inserted between each of the symbols to prevent inter-symbol interference at the second network device (e.g., the receiver) caused by multi-path delay spread in the radio channel. In an embodiment, multiple symbols can be concatenated to create a final burst signal. At the second device, a transform function (e.g., FFT) is performed on the symbols to recover the original data bits.

Figure 3A:
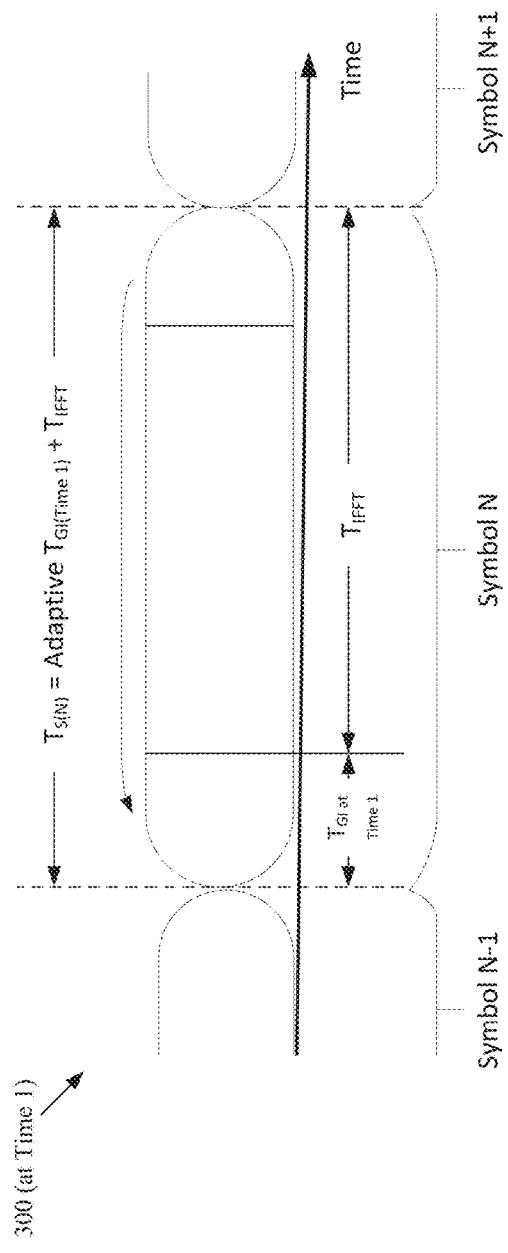
FIGS. 3A and 3B illustrate example data symbols including an adaptive guard interval duration, according to one or more embodiments.

FIG. 3A illustrates an example portion 300 of the first subcarrier portion of the first wireless signal transmitted by the first network device at the first time. As shown in FIG. 3A, the first wireless signal portion 300 includes a set of data symbols (e.g., Symbol N−1, Symbol N, Symbol N+1), also referred to as frames with cyclic extensions. As shown, example Symbol N (i.e., S(N)) has a length or duration of time ($T_{S(N)}$), also referred to as an "extended symbol time", represented by the following expression:

$$T_{S(N)} = \text{Adaptive } T_{GI(Time\ 1)} + T_{IFFT};$$

where Adaptive $T_{GI(Time\ 1)}$ is the adaptive guard interval (GI) duration established and inserted at Time 1; and $T_{IFFT}$ is the inverse FFT time period or useful symbol time period.

In an embodiment, the adaptive guard interval duration at the first time can be a default or predetermined value corresponding to a ratio of a cyclic prefix (CP) time to the inverse fast Fourier transfer time ($T_{IF}FT$). In an embodiment, the guard interval time or duration is used to eliminate inter-symbol and inter-carrier interference. In an embodiment, the $T_{IFFT}$ period represents the useful symbol period. In an embodiment, each symbol is transmitted for an extended symbol time T(s) including the active (or useful) symbol time $T_{IFFT}$ and the adaptive guard interval duration to enable distinct transmissions to avoid interference with one another and avoid overlapping transmissions. In an embodiment, the adaptive guard interval having the first guard interval duration is inserted into the first wireless signal to protect against propagation delays, echoes, and reflections, to which the underlying digital data corresponding to the set of data symbols is sensitive.

In operation 220, the processing logic of the second network device (e.g., the client device) determines, in view of the pilot symbols, information associated with a channel impulse response corresponding to the link of the multipath channel of the wireless network. In an embodiment, to obtain the channel state information (CSI), the pilot symbols embedded in each symbol are utilized. In an embodiment, the pilot symbols (e.g., complex exponentials in time) are embedded in each symbol and from data symbols in the frequency-domain. In an embodiment, pilot symbols can be inserted into every symbol to facilitate channel estimation (e.g., using pilot-assisted channel estimation).

In an embodiment, channel impulse responses of the pilot symbols (or pilot signals) are complex channel numbers or coefficients. For example, the channel impulse response can be represented as a complex matrix of M×N×56 for a system having M number of inputs, N number of outputs, and a 20 MHz channel bandwidth. FIG. 4 illustrates an example channel impulse response of complex channel coefficients determined based on the pilot symbols. In an embodiment, sets of complex channel coefficients are captured during a channel-state assessment. In an embodiment, the second device can use an equalizer or decoder configured to employ a frequency-domain channel estimation process or scheme (e.g., a least squares estimation, a minimum mean square error estimation, a maximum likelihood to estimate the channel impulse response from the complex channel coefficients.

In operation 230, the processing logic of the second device calculates one or more channel parameters based on the information associated with the channel impulse response. In an embodiment, the one or more channel parameters represent or quantify a multipath channel of the wireless network. In an embodiment, the one or more channel parameters can be determined from a power delay profile corresponding to the channel impulse response of the multipath channel.

Figure 5:
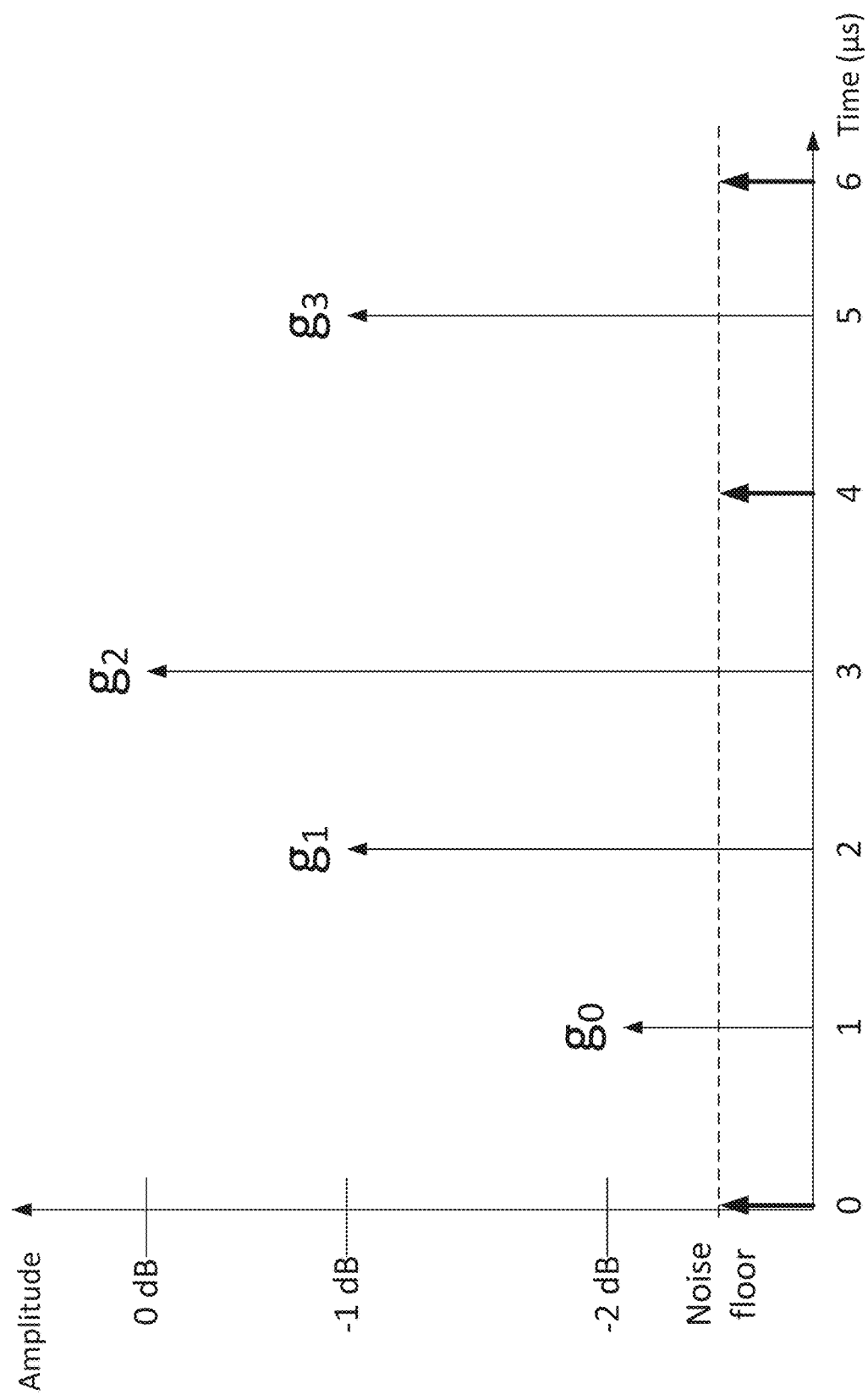
FIG. 5 illustrates an example multipath power profile representing signal amplitude over time for a multipath channel of a wireless network including one or more network devices configured to establish an adaptive guard interval duration, according to one or more embodiments.

FIG. 5 illustrates an example multipath power profile representing signal amplitude (in dB) over time (in μs) for a multipath channel including system noise (e.g., a noise floor) and a set of spurious components. In an embodiment, the noise floor represents a measure of a signal created from a sum of all the noise sources and unwanted signals within a measurement system, wherein the noise is defined as any signal other than the one or more transmitted signals being monitored.

Figure 6:
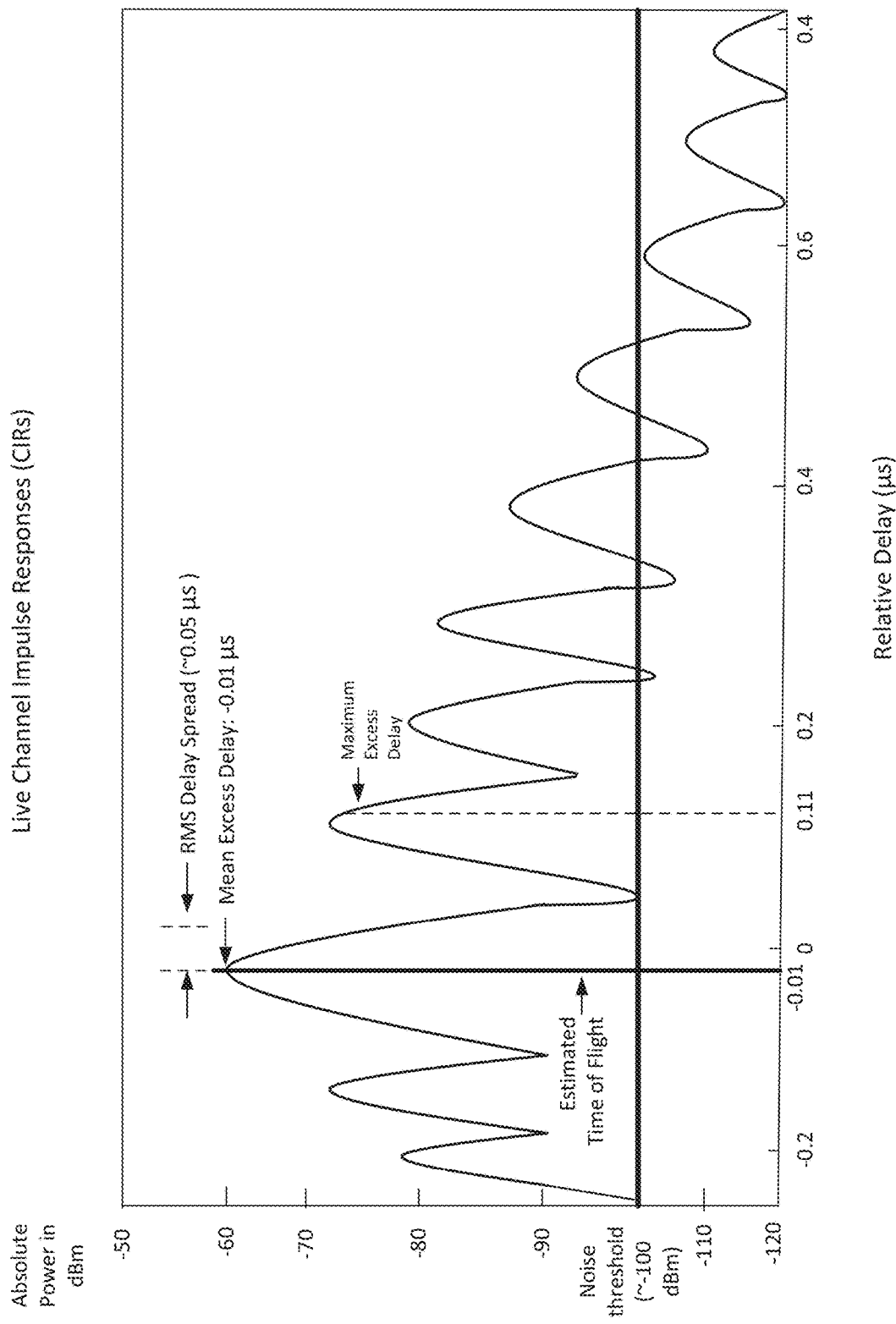
FIG. 6 illustrates an example live channel impulse response and associated channel parameters for use in determining an adjusted guard interval duration corresponding to a wireless link between a first network device and a second network device in a wireless network, according to one or more embodiments.

FIG. 6 illustrates an example live channel impulse identified or captured for an example indoor wireless network including a multipath channel between a transmitter network device (e.g., an access point network device) and a client device. As shown in FIG. 6, an absolute power (in dBm) of the live channel impulse response is plotted against a relative delay (in μs) for the example indoor wireless network.

In an embodiment, the one or more channel parameters can include a mean excess delay, a maximum excess delay, a time of flight, and a root-mean-square (RMS) delay spread. In an embodiment, the mean excess delay can represent a relative delay of an $i^{th}$ multipath component as compared to a first arriving multipath component in a power delay profile (e.g., as shown in FIG. 5). In an embodiment, a maximum excess delay (corresponding to X db) of power delay profile represents a time delay during which the multipath energy falls to X dB below the maximum. In an embodiment, a time of flight (Tof) is a measurement of a time taken by the wireless signal to travel a distance via the link of the multipath channel.

In an embodiment, the root-mean-square (RMS) delay spread is a measurement corresponding to a delay spread associated with the multipath channel. In an embodiment, the delay spread is a measure of a quality of the multipath wireless channel representing a difference between a time of arrival of an earliest significant multipath component (e.g. a line-of-sight component) and a time of arrival of a last or least significant multipath component. In an embodiment, the RMS delay spread represents a power weighted standard deviation of the excess delays which provides a measure of the variability of the mean delay.

In an embodiment, the processing logic calculates the RMS delay spread (e.g., a square root of a mean square (or quadratic mean) of the delay spread, as described in greater detail herein with reference to FIGS. 5 and 6. FIG. 5 illustrates an example multipath power profile representing signal amplitude (in dB) over time (in μs) for a multipath channel including system noise (e.g., a noise floor) and a set of spurious components. In an embodiment, the noise floor represents a measure of a signal created from a sum of all the noise sources and unwanted signals within a measurement system, wherein the noise is defined as any signal other than the one or more transmitted signals being monitored.

FIG. 5 illustrates a fractional power in an $i^{th}$-path ($b_i$) of a gain of the multipath component ($g_i$). In an embodiment, the fractional power in the $i^{th}$-path ($b_i$) can be represented by the following expression:

$$[\text{Fractional power in the } i\text{th path}(b_i)] : b_i = \frac{g_i}{\sum_{i=0}^{L-1} g_i} \quad \text{Equation 1}$$

Where L denotes a number of paths in the multipath channel.

In an embodiment, an average delay ($\bar{\tau}$) can be represented by the following expression:

$$[\text{Average Delay}(\bar{\tau})] : \bar{\tau} = \quad \text{Equation 2}$$

$$b_0 \tau_0 + b_1 \tau_1 + b_2 \tau_2 + \ldots b_{L-1} \tau_{L-1} = \sum_{j=0}^{L-1} b_j \tau_j$$

Substituting Equation 1 into Equation 2 results in the following expression of the average delay ($\bar{\tau}$):

$$[\text{Average Delay}(\bar{\tau})] : \bar{\tau} = \frac{\sum_{i=0}^{L-1} g_i \tau_i}{\sum_{i=0}^{L-1} g_i} \quad \text{Equation 3}$$

In an embodiment, the RMS delay spread or standard deviation of the delay time ($\sigma_\tau$) is determined based on a variance of the delay time ($\sigma_\tau^2$). In an embodiment, the variance of the delay time ($\sigma_\tau^2$) is represented by the following expression:

[Variance of delay time ($\sigma_\tau^2$)]: $\sigma_\tau^2 = b_0(\tau_0-\bar{\tau})^2 + b_1(\tau_0-\bar{\tau})^2 + \ldots$  Equation 4

In an embodiment, the RMS delay spread ($\sigma_\tau$) is represented by the following expression:

$$[\text{RMS delay spread} (\sigma_\tau)] : \sigma_\tau = \sqrt{\sum_{i=0}^{L-1} b_1(\tau_i - \bar{\tau})^2}$$ Equation 5

Substituting Equation 1 into Equation 5, the RMS delay spread ($\sigma_\tau$) can be represented by the following expression:

$$\sigma_\tau = \sqrt{\frac{\sum_{i=0}^{L-1} g_i(\tau_i - \bar{\tau})^2}{\sum_{i=0}^{L-1} g_i}}$$ Equation 6

In an embodiment, the gain of a multipath component ($g_i$) can be expressed in terms of an amplitude of a channel impulse response ($a_i$) as follows: $g_i = |a_i|^2$. In an embodiment, the RMS delay spread ($\sigma_\tau$) can be expressed as follows:

$$\sigma_\tau = \sqrt{\frac{\sum_{i=0}^{L-1} |a_i|^2 (\tau_i - \bar{\tau})^2}{\sum_{i=0}^{L-1} |a_i|^2}}$$ Equation 7

As shown in FIG. 6, an RMS delay spread (e.g., approximately 0.05 μs) is calculated based on the channel impulse response information, as described in detail above. In the example shown, one or more additional channel parameters including an estimated time of flight (e.g., having a relative delay value of approximately −0.1 μs), a mean excess delay (e.g., having a relative delay value of approximately −0.1 μs), and a maximum excess delay (e.g., having a relative delay value of 0.11 μs). Advantageously, in an embodiment, as shown, using the channel impulse response, a use-case-specific (e.g., factors associated with a particular link corresponding to a particular first network device (e.g., a transmitter network device such as an access point network device) and a particular second network (e.g., a client device), one or more corresponding channel parameter values (e.g., an RMS delay spread) are determined.

In operation 240, the processing logic determines a first physical rate associated with the link. In an embodiment, the first physical rate (also referred to as a "data rate" or "PHY rate") is determined based on the first guard interval duration used in the transmission of the first wireless signal via the link at the first time. In an embodiment, the first physical rate is determined according to the following expression:

$$PHY \text{ Rate} = \frac{SD \times BPSCS \times R \times SS}{T_{DFT} + T_{GI}}$$ Equation 8 where SD is a number of data subcarriers; BPSCS is a number of coded bits per subcarrier per stream; R is a coding value (e.g., FEC value), SS is a number of spatial streams; $T_{DFT}$ is a symbol duration time, and $T_{GI}$ is a guard interval duration.

In an embodiment, the processing device calculates a physical (PHY) rate for the first wireless signal transmitted at the first time using the first guard interval duration (i.e., $T_{GI}$=the first guard interval duration).

In operation 250, the processing logic of the second network device determines an adjusted guard interval duration based on the channel parameter. In an embodiment, the adjusted guard interval duration is set to the channel parameter value calculated in operation 230. For example, the adjusted guard interval duration can be equal to the RMS delay spread value calculated based on the channel impulse response, as described in detail above. In an embodiment, the processing logic can establish the adjusted guard interval duration (e.g., an adjusted length of the guard interval) to the determined channel parameter (e.g., the RMS delay spread) on a per client device and per use-case basis to maximize a corresponding throughput level.

In an embodiment, the adjusted guard interval duration (e.g., a duration equal to the calculated channel parameter) can be used to determine an estimated physical rate (also referred to as a "second physical rate") associated with the particular link (e.g., the link-specific physical rate) between the client device and the transmitter network device. In an embodiment, the processing logic estimates the physical rate based on the adjusted guard interval duration (e.g. wherein the RMS delay spread is substituted for $T_{GI}$) using Equation 8, as shown above. In an embodiment, the adjusted guard interval duration is determined in real-time to ensure that a particular client device is receiving a portion of a throughput budget of the network that corresponds to the particular client device requirements based on a current use case (e.g., environmental factors associated with a location of the client device, the communication link between the client device and the transmitting network device), the one or more applications being executed by the client device, the physical rate, etc.).

In operation 260, the processing logic determines whether the second physical rate satisfies a condition. In an embodiment, the condition is satisfied when the second physical rate (e.g., the second physical rate determined using the adjusted guard interval duration or second guard interval duration) associated with the link is greater than the first physical rate (e.g., the first physical rate determined based on the first guard interval duration). In an embodiment, if the condition is satisfied, the process continues to operation 270.

In an embodiment, the processing logic can perform operation 260 as part of a rate adaptation process or scheme to determine whether the second physical rate is an optimized throughput level (e.g., exceeds the first physical rate) for the particular use case scenario (e.g., a suitable IEEE 802.11n/ac/ax rate adaptation process). In an embodiment, the rate adaptation process can be executed to identify a packet error rate (PER) associated with the link. In an embodiment, the PER represents a number of error packets after Forward Error Correction (FEC) divided by a total number of received packets (e.g., a unit of data of the wireless transmission that is subject to FEC). In an embodiment, the adjusted guard interval duration can be established to maximize the throughput level and minimize latency while the wireless link (e.g., RF link) is operating at a target (e.g., desired) PER threshold.

In an embodiment, as shown in FIG. 2, if the condition is not satisfied (i.e., the second physical rate does not exceed the first physical rate), then the process 200 returns to operation 220 and repeats the determination of the channel impulse response. In this embodiment, based on the updated capture of the live channel impulse response, one or more updated channel parameters (e.g., an updated RMS delay spread) is calculated (e.g., in operation 230), an updated PHY rate is determined based on the current (e.g., the inserted) guard interval duration (e.g., in operation 240), and the channel parameter is used to determine or estimate a new adjusted guard interval duration (e.g., in operation 250) which is used to determine if the condition is satisfied in operation 260. In an embodiment, operations 220-260 can be iteratively executed until an adjusted guard interval duration is determined that corresponds to an updated or estimated physical rate (e.g., a second physical rate, a third physical rate, a fourth physical rate, etc.) that is greater than a current physical rate (e.g., an actual or measured physical rate associated with the received wireless signal) based on the inserted guard interval duration.

In operation 270, the processing logic of the second network device provides to the first network device a communication identifying the adjusted guard interval duration. In an embodiment, the communication or feedback (e.g., to the adaptive guard interval feedback information 150 of FIG. 1). In an embodiment, the feedback information identifying the adjusted guard interval duration identified by the processing logic of the second network device can be included in a set of channel state information (CSI) transmitted to the first network device via a conventional bus.

In an embodiment, the first network device receives the communication identifying the adjusted guard interval duration. In an embodiment, the first network device can insert an adjusted guard interval having the adjusted guard interval duration into a portion of the signal to be transmitted to the second network device.

In operation 280, the processing logic of the first network device transmits, at a second time, a second wireless signal including second data symbols associated with the adjusted guard interval duration (i.e., the second guard interval duration determined in operation 250). In an embodiment, the use of the adjusted guard interval duration enables the optimizing of the transmitted wireless signal (e.g., the second wireless signal) for each particular use case associated with the multiple different client devices connected to one or more transmitter network devices within the wireless network.

Figure 3B:
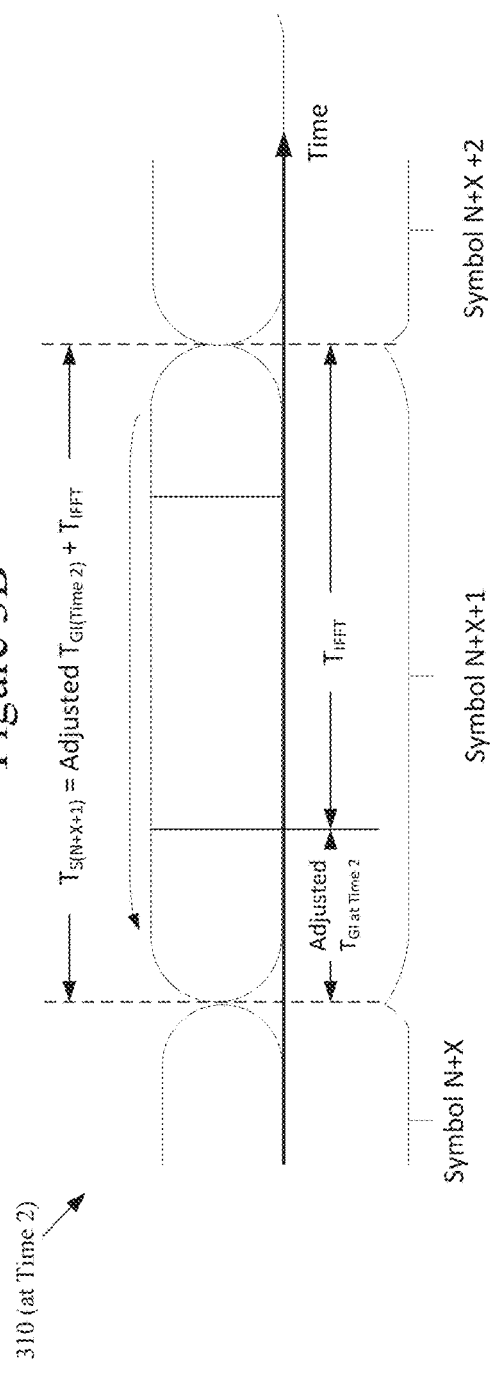

FIG. 3B illustrates an example portion 310 of a portion of the second wireless signal transmitted by the first network device at a second time (e.g., a time following the receipt of the communication identifying the adjusted guard interval duration). As shown in FIG. 3B, the second wireless signal portion 310 includes a set of data symbols (e.g., Symbol N+X, Symbol N+X+1, Symbol N+X+2). As shown, the adjusted guard interval duration (Adjusted $T_{GI(Time\ 2)}$) is inserted at a beginning of Symbol N+X+1. Accordingly, Symbol N+X+1 has a length or duration of time ($T_{S(N+X+1)}$) represented by the following expression:

$$T_{S(N+X+1)} = \text{Adjusted } T_{GI(Time\ 2)} + T_{IFFT};$$

where Adjusted $T_{GI(Time\ 2)}$ is the adaptive guard interval (GI) duration established in accordance with method 200 and inserted at Time 2; and $T_{IFFT}$ is the inverse FFT time period.

Advantageously, channel impulse response mechanisms (e.g., existing IEEE 802.11n/ac channel sounding mechanisms) can be used to dynamically adjust the inter-symbol guard interval (e.g., per sub-carrier (e.g., per symbol), per spatial stream) on a per access point network device-to-client device (e.g., specific use case) basis for each of the multiple client devices with the wireless network. According to embodiments, the guard interval duration can be adapted or adjusted to correspond to an optimized throughput rate for the particular use case scenario corresponding to the client device as determined using a suitable IEEE 801.11-based rate adaptation scheme. Furthermore, an adaptation of the guard interval for each connection link (e.g., each client device to a transmitter network device connection link) based on corresponding channel characteristic information increases the throughput and PHY rates for the respective client device and improves the overall performance and efficiency of the wireless network, thereby benefiting all of the client devices concurrently connected within the wireless network.

For example, an example wireless network (e.g., an OFDM, 64-QAM (quadrature amplitude modulation) having a 20 MHz channel bandwidth, in MCS14 operation (modulation coding scheme 14) may exhibit a maximum physical data rate of about 117 Mbps at a default guard interval duration (e.g., 0.4 µs) at a first time for a particular use case (e.g., a specific access point network device-to-client device link carrying wireless signals corresponding to a first application executing on the client device (e.g., an AR/VR application, a gaming application, a streaming media application, etc.). In an embodiment, the processing logic can determine an adjusted inter-symbol guard interval duration of 0.2 µs based on a run-time channel impulse response measurement and estimated RMS delay spread of a specific access point network device-to-client device link which results in a physical data rate of approximately 138 Mbps. In this example, the increased physical rate level results in an approximate increase of 15% in throughput and reduced latency levels, without increasing the transmission power, receive signal-to-noise ratio, or signal processing overheads.

Figure 7:
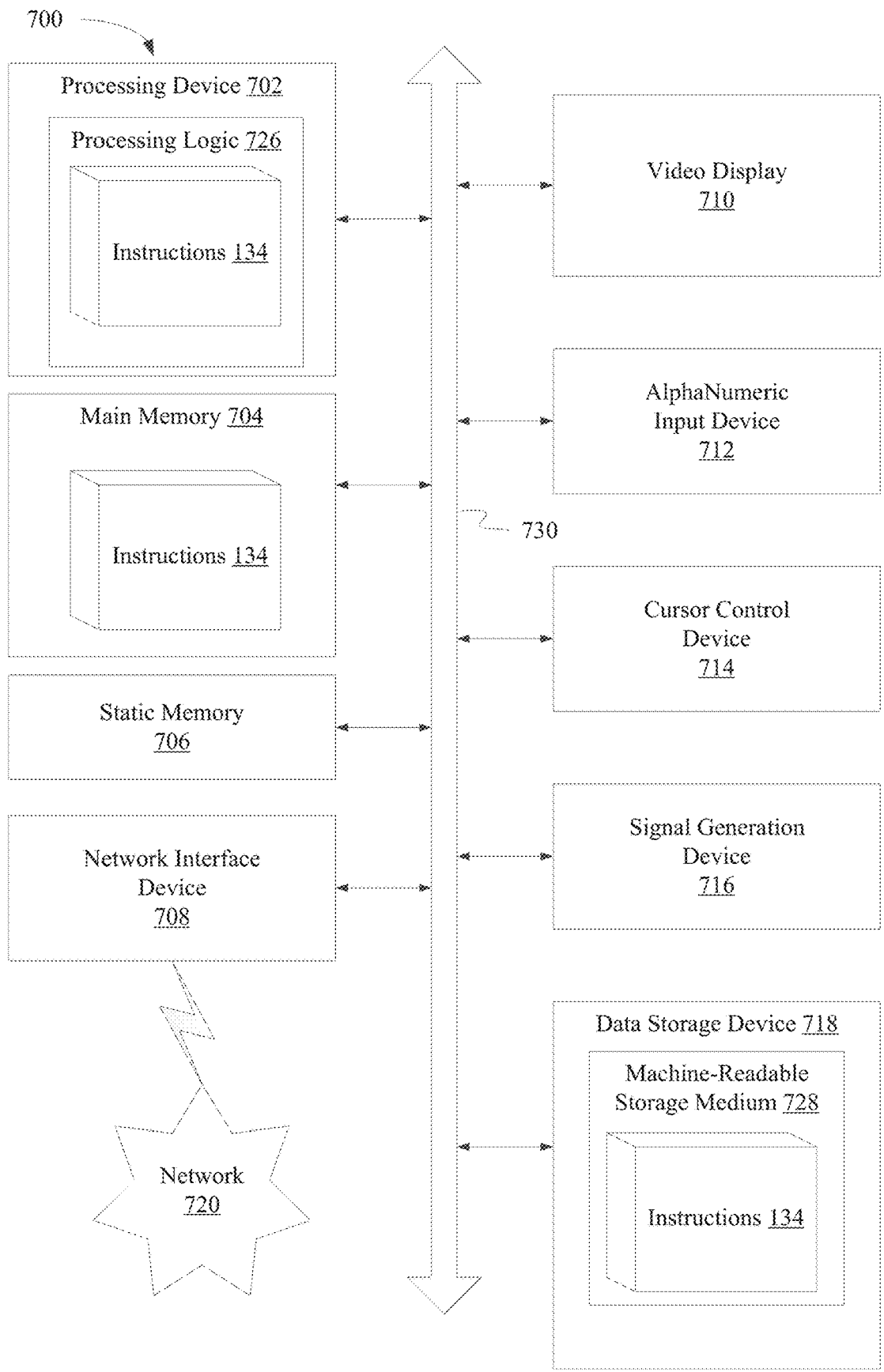
FIG. 7 illustrates a diagrammatic representation of a machine in the example form of a computer system including a set of instructions executable by a computer to manage adaptive guard interval durations associated with respective client devices in a wireless network, according to one or more embodiments.

FIG. 7 illustrates a diagrammatic representation of a machine in the example form of a computer system 700 including a set of instructions executable by a computer to manage connectivity of a client device in a mesh network based on synchronized connection cost metrics associated with multiple connection paths according to any one or more of the methodologies discussed herein. In one embodiment, the computer may include instructions to enable execution of the processes and corresponding components shown and described in connection with FIGS. 1-6.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 1202, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application-specific integrated circuit (ASIC), a field-programmable gate array (FPGA), a digital signal processor (DSP), network processor, or the like. In various implementations of the present disclosure, the processing device 702 is configured to execute instructions for the electronic publication navigation management system 102 for performing the operations and processes described herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable storage medium 728 (or machine-readable medium) on which is stored one or more sets of instructions 134 (e.g., instructions of the adaptive guard interval insertion module 114 or the adaptive guard interval identification module 124) embodying any one or more of the methodologies or functions described herein. The instructions 134 may also reside, completely or at least partially, within the main memory 704 and/or within processing logic 726 of the processing device 702 during execution thereof by the computer system 700, the main memory 704 and the processing device 702 also constituting computer-readable media.

The instructions may further be transmitted or received over a network 720 via the network interface device 708. While the computer-readable storage medium 728 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as: "detecting", "identifying", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving at a first time, by a client device from a network device via a wireless communication link between the client device and the network device, a first wireless signal comprising (i) a set of data symbols associated with a first duration of a guard interval and (ii) a set of pilot symbols;
determining, by the client device, based on the set of pilot symbols, a channel impulse response corresponding to the wireless communication link;
calculating, by the client device, a root-mean-square delay spread value based on the channel impulse response;
determining a first physical rate associated with the wireless communication link based on the first duration of the guard interval;
establishing a second duration of the guard interval equal to the root-mean-square delay spread value;
estimating a second physical rate associated with the wireless communication link based on the second duration of the guard interval;
determining that the second physical rate is greater than the first physical rate;
sending data to the network device, wherein the data comprises an indication of the second duration of the guard interval; and
receiving at a second time, by the client device from the network device via the wireless communication link, a second wireless signal comprising a second set of data symbols associated with the second duration of the guard interval.

2. The method of claim 1, wherein the channel impulse response comprises a set of complex channel coefficients corresponding to the set of pilot symbols of the first wireless signal, and wherein calculating the root-mean-square delay spread value further comprising calculating the root-mean-square delay spread value using the set of complex channel coefficients.

3. The method of claim 1, wherein the second duration of the guard interval is inserted at a beginning of each data symbol of the second set of data symbols.

4. A system comprising:
a set of network devices forming a wireless network, the set of network devices comprising a first network device and a second network device, the second network device comprising:
a processing device; and
a memory to store computer-executable instructions that, if executed, cause the processing device to perform operations comprising:
receiving, via a wireless communication link with the first network device at a first time, a first wireless signal, wherein the first wireless signal comprises (i) a first set of data symbols associated with a first duration of a guard interval and (ii) a first set of pilot symbols;
determining, based on a channel impulse response associated with the first set of pilot symbols, a second duration of the guard interval; and
sending data to the first network device, the data comprising an indication of the second duration of the guard interval.

5. The system of claim 4, the operations further comprising:
receiving, from the first network device at a second time, a second wireless signal, wherein the second wireless signal comprises a second set of data symbols associated with the second duration of the guard interval.

6. The system of claim 4, the operations further comprising:
calculating a root-mean-square delay spread value based on the channel impulse response; and
establishing the second duration of the guard interval equal to the root-mean-square delay spread value.

7. The system of claim 4, the operations further comprising:
determining, based on the first duration of the guard interval, a first physical rate associated with the wireless communication link; and
determining, based on the second duration of the guard interval, a second physical rate associated with the wireless communication link.

8. The system of claim 7, wherein the second network device sends the data to first network device in response to determining the second physical rate is greater than the first physical rate.

9. The system of claim 4, the operations further comprising:
receiving, from the first network device at a second time, a second wireless signal, wherein the second wireless signal comprises (i) a second set of data symbols associated with the second duration of the guard interval and (ii) a second set of pilot symbols, wherein the second network device is in a different physical location at the second time as compared to the first time;
determining a second channel impulse response based on the second set of pilot symbols; and
determining, based on the second channel impulse response, a third duration of the guard interval.

10. The system of claim 9, the operations further comprising:
sending second data to the first network device, the second data comprising an indication of the third duration of the guard interval; and
receiving, from the first network device at a third time, a third wireless signal comprising a third set of data symbols associated with the third duration of the guard interval.

11. The system of claim 4, wherein the first duration of the guard interval is inserted at a beginning of each data symbol of the first set of data symbols.

12. The system of claim 11, the operations further comprising:
calculating a root-mean-square delay spread value using the set of complex channel coefficients, wherein the channel impulse response comprises a set of complex channel coefficients corresponding to the set of pilot symbols of the first wireless signal; and
establishing the second duration of the guard interval equal to the root-mean-square delay spread value.

13. A network device of a set of network devices in a wireless network, the network device comprising:
a processing device; and a memory to store computer-executable instructions that, if executed, cause the processing device to perform operations comprising:

receiving, via a wireless communication link with an access point network device at a first time, a first wireless signal, wherein the first wireless signal comprises (i) a first set of data symbols associated with a first duration of a guard interval and (ii) a first set of pilot symbols;

determining, based on a channel impulse response associated with the first set of pilot symbols, a second duration of the guard interval; and sending data to the access point network device, the data comprising an indication of the second duration of the guard interval.

14. The network device of claim 13, the operations further comprising:

receiving, from the access point network device at a second time, a second wireless signal, wherein the second wireless signal comprises a second set of data symbols associated with the second duration of the guard interval.

15. The network device of claim 13, the operations further comprising:

calculating a root-mean-square delay spread value based on the channel impulse response; and establishing the second duration of the guard interval equal to the root-mean-square delay spread value.

16. The network device of claim 13, the operations further comprising:

determining, based on the first duration of the guard interval, a first physical rate associated with the wireless communication link; and determining, based on the second duration of the guard interval, a second physical rate associated with the wireless communication link.

17. The network device of claim 16, wherein the access point network device sends the data to first network device in response to determining the second physical rate is greater than the first physical rate.

18. The network device of claim 13, the operations further comprising:

receiving, at a second time, a second wireless signal, wherein the second wireless signal comprises (i) a second set of data symbols associated with a second duration of the guard interval and (ii) a second set of pilot symbols, wherein the network device is in a different physical location at the second time as compared to the first time;

determining a second channel impulse response based on the second set of pilot symbols; and determining, based on the second channel impulse response associated with the second set of pilot symbols, a third duration of the guard interval.

19. The network device of claim 18, the operations further comprising:

sending second data to the access point network device, the second data comprising an indication of the third duration of the guard interval; and receiving, from the access point network device at a third time, a third wireless signal comprising a third set of data symbols associated with the third duration of the guard interval.

20. The network device of claim 13, wherein the first duration of the guard interval is inserted at a beginning of each data symbol of the first set of data symbols.

* * * * *